(12) United States Patent
Guillet et al.

(10) Patent No.: US 11,655,177 B2
(45) Date of Patent: May 23, 2023

(54) BURNER COMPRISING A WEARING PIECE

(71) Applicant: SAINT-GOBAIN ISOVER, Courbevoie (FR)

(72) Inventors: Antoine Guillet, Paris (FR); Frédéric Lopepe, Rosny Sous Bois (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 16/765,779

(22) PCT Filed: Nov. 29, 2018

(86) PCT No.: PCT/FR2018/053048
§ 371 (c)(1),
(2) Date: May 20, 2020

(87) PCT Pub. No.: WO2019/106309
PCT Pub. Date: Jun. 6, 2019

(65) Prior Publication Data
US 2020/0290914 A1    Sep. 17, 2020

(30) Foreign Application Priority Data
Nov. 30, 2017  (FR) ..................................... 1761406

(51) Int. Cl.
| C03B 5/235 | (2006.01) |
| F23C 3/00 | (2006.01) |
| F23C 5/08 | (2006.01) |
| F23D 14/02 | (2006.01) |

(Continued)

(52) U.S. Cl.
CPC ............ *C03B 5/2356* (2013.01); *F23C 3/004* (2013.01); *F23C 5/08* (2013.01); *F23D 14/02* (2013.01); *F23D 14/64* (2013.01); *F23M 5/025* (2013.01); *C03B 2211/23* (2013.01);
(Continued)

(58) Field of Classification Search
CPC ................................................... C03B 5/2356
See application file for complete search history.

(56) References Cited

U.S. PATENT DOCUMENTS

| 5,199,866 A | 4/1993 | Joshi et al. | |
| 6,805,773 B1 * | 10/2004 | Brooker | C10J 3/00 |
| | | | 202/217 |

(Continued)

FOREIGN PATENT DOCUMENTS

| EP | 2 812 632 A1 | 12/2014 |
| WO | WO 2007/048429 A1 | 5/2007 |

(Continued)

OTHER PUBLICATIONS

International Search Report as issued in International Patent Application No. PCT/FR2018/053048, dated Mar. 11, 2019.

*Primary Examiner* — Nathaniel Herzfeld
(74) *Attorney, Agent, or Firm* — Pillsbury Winthrop Shaw Pittman LLP

(57) ABSTRACT

A burner for a facility for melting vitrifiable materials, includes an injector block including a combustion gas distribution network and at least one injector, and a plate in glass and/or flame contact which overlaps the injector block and includes at least one injection hole in fluid communication with the injector, wherein the plate is removably attached to the injector block.

20 Claims, 2 Drawing Sheets

(51) Int. Cl.
  *F23D 14/64* (2006.01)
  *F23M 5/02* (2006.01)
(52) U.S. Cl.
  CPC ...... *C03B 2211/60* (2013.01); *F23D 2213/00* (2013.01); *F23D 2214/00* (2013.01)

(56) References Cited

U.S. PATENT DOCUMENTS

| | | | |
|---|---|---|---|
| 2005/0236747 A1* | 10/2005 | Rue | C03B 5/2356 266/217 |
| 2015/0000343 A1* | 1/2015 | Lefrere | C03B 5/44 65/134.4 |
| 2016/0075586 A1* | 3/2016 | Charbonneau | C03B 5/1675 431/10 |
| 2016/0083279 A1* | 3/2016 | Cai | C03B 5/2353 432/13 |
| 2016/0153654 A1* | 6/2016 | Richardson, III | F23C 3/004 431/160 |
| 2017/0059154 A1* | 3/2017 | Luka | C03B 5/2356 |
| 2018/0058688 A1* | 3/2018 | Faulkinbury | F23D 14/78 |

FOREIGN PATENT DOCUMENTS

| | | |
|---|---|---|
| WO | WO 2013/117851 A1 | 8/2013 |
| WO | WO 2016/120346 | 8/2016 |
| WO | WO 2016/120350 A1 | 8/2016 |

* cited by examiner

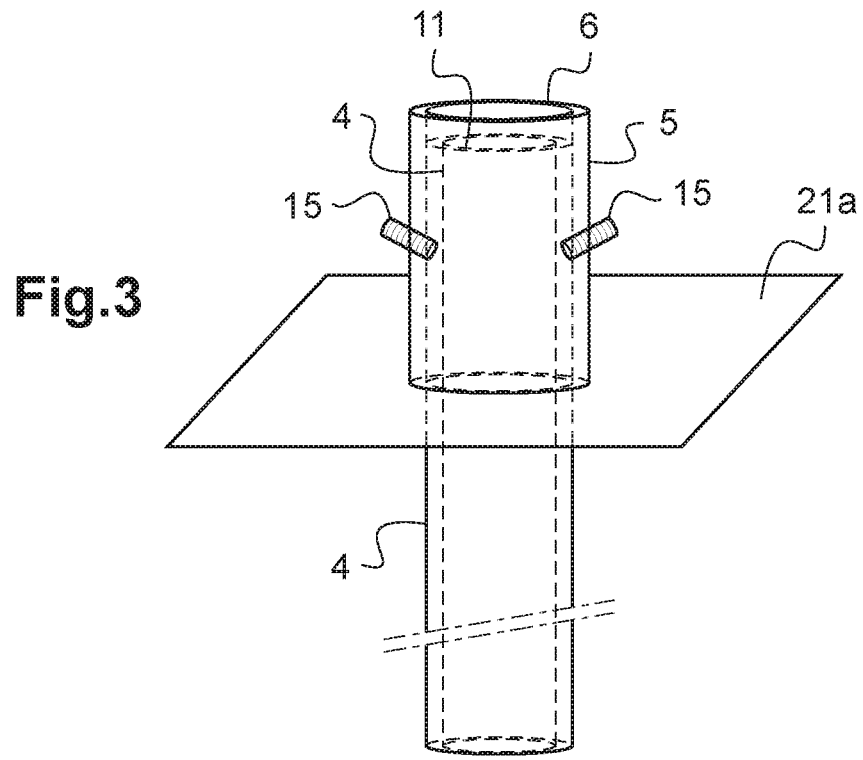
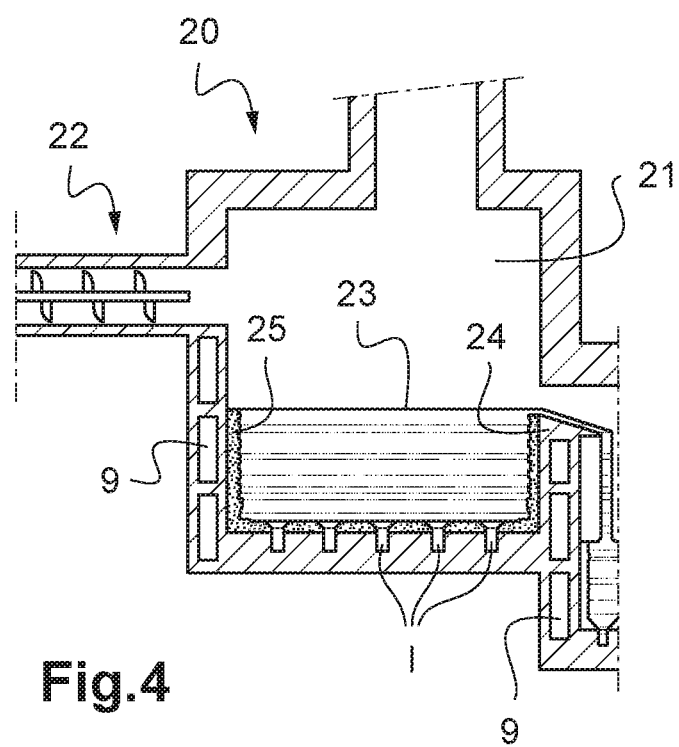

BURNER COMPRISING A WEARING PIECE

CROSS-REFERENCE TO RELATED APPLICATIONS

This application is the U.S. National Stage of PCT/FR2018/053048, filed Nov. 29, 2018, which in turn claims priority to French patent application number 1761406 filed Nov. 30, 2017. The content of these applications are incorporated herein by reference in their entireties.

The present invention relates to a burner for a glass furnace, a facility incorporating such a burner, and the use of such a facility for melting a composition of vitrifiable materials. The invention more particularly relates to facilities for forming flat glass such as float or rolling facilities, but also facilities for forming hollow glass of the bottle, vial type, and more particularly facilities for forming glass fibers of the thermal or sound insulating mineral wool type or so-called reinforcing textile glass yarns.

The vitrifiable materials are generally of oxide type, and generally comprise at least 30% by mass of silica, such as a glass or a silicate like an alkaline and/or alkaline earth silicate. The glass can, in particular, be soda-lime glass or from the rock often called "black glass" by a person skilled in the art. The aim of the terms "vitrifiable materials" and "raw materials" is therefore to cover the materials necessary for obtaining a glassy (or ceramic or glass-ceramic) matrix, like silica sand, rock, blast furnace slags, but also all additives (refining additives), deconstruction waste (including mineral fibers), all possible liquid or solid fuels (optionally composite plastic, organic matter, coals), and any type of cullet. In the description, the expressions "liquid glass" and "bath of glass" refer to the result of melting these vitrifiable materials.

To liquefy the vitrifiable materials, the simplest solution consists in using burners fed with cool air. However, to increase the performances of the furnace in terms of maximum melting rate and thermal efficiency, it is desirable to have a flame temperature that is as high as possible. The two most used techniques to achieve this consist either in pre-heating combustion air by using the sensible heat contained in the fumes exiting the furnace, via refractory material regenerators or air/fume metal exchangers (called recuperators in the glass industry), or in using oxygen and/or superoxygenated air as oxidants. The present invention covers all of these burners and particularly the burners using oxygen, which are subjected to increased corrosion due to the higher operating temperature thereof, and to the presence of strong concentrations of soda in the fumes.

In a known manner, the burners can be arranged above the surface of the molten glass, for example at the breast wall, gables or crown, or be arranged below the liquid glass level, for example in the furnace bottom. These are then referred to as "submerged burners". A burner can comprise one or more injectors, arranged in a line or in a ring.

The burner conventionally comprises, at the lower part, a combustion gas distribution network, connected at the upper part to an injector.

In the present text, the frame of reference arbitrarily chosen to describe the invention has, at the upper part, the interior of the furnace and, at the lower part, the exterior. The expression "combustion gas" designates a mixture of at least one fossil fuel, for example natural gas, with at least one oxidant, for example air and/or oxygen.

Documents from the prior art, including the patent document WO2016120346, describe a burner with an injector projecting from the surface of the burner in order to extend within the glass melting chamber. The injector is then "in glass and/or flame contact", which means that it is brought into contact with liquefied gas and/or the flames of the burner, in a limited manner for above-surface burners, or continuously for submerged burners. The exposure of the injector to the flames is particularly significant when they are pressed back by the liquid glass and/or during the injection pressure changes. In this context, the injector is exposed to corrosion by the liquid glass, and to oxidation by the flames and/or the fumes resulting from combustion. As a result, such an injector has an unsatisfactory life and involves high maintenance costs.

In order to at least partially overcome these disadvantages, some single-piece burners, such as that described in the patent document EP2812632, comprise, at the upper part, a plate, in glass and/or flame contact, which overlaps and protects, at least temporarily, the injector or injectors from the erosion and/or oxidation phenomena described above.

However, such single-piece burners have the disadvantages of being complex to machine and require a substantial amount of maintenance time and costs. In practice, when a burner is identified as being faulty, the replacement thereof requires the complete shutdown of the furnace. This operation, which is not without risk for the operator, considerably affects the productivity of the melting facility. Indeed, the burner, once removed from the furnace, is replaced in the entirety thereof. This constitutes a prohibitive disadvantage in terms of maintenance, given the unit cost of a burner and the time required for the manufacture thereof, particularly for the purposes of a large-scale use of the melting facility.

Therefore, there is a need to provide a burner, at least part of which has an increased life, and the maintenance of which is easier, quicker and less costly.

The present invention meets this need. More particularly, in at least one embodiment, the proposed technique refers to a burner for a facility for melting vitrifiable materials, comprising:

an injector block comprising a combustion gas distribution network and at least one injector, and a plate in glass and/or flame contact which at least partially overlaps said injector block and comprises at least one injection hole in fluid communication with said injector, said burner being characterized in that the plate is removably attached to the injector block.

In the present text, the term "removable" describes a reversible attachment, without damage to the pieces that are attached to one another. Conversely, the welding of two pieces together is considered to be an irreversible attachment. The terms "surmounted" and "on" intend to describe the arrangement of the plate, which at least partially overlaps the injector block in order to protect it from the phenomena of erosion by the liquid glass and/or oxidation by the flames and/or the combustion fumes, which take place inside the furnace. The plate at least partially overlaps the injector block in the sense that, according to a specific embodiment, it surmounts the upper part of the injector block but not the injector or injectors.

The invention is based on a new and inventive concept consisting in providing a burner in which the injector block and the plate are two separate pieces removably attached to one another.

During the maintenance of the burner, it is thus possible to only replace the faulty piece, the other piece being reusable. In general, this piece that is faulty first is the plate since this is in direct contact with the liquid glass, and is therefore subject to corrosion therefrom. Yet, the injector block is significantly more complex to produce than the plate, in particular with regard to the care given to the machining of the combustion gas distribution network. The injector block of a burner according to the invention therefore has a significantly increased life. The production of the injector block and of the plate is also made easier, these two pieces being produced separately and potentially via different methods suited to the technical specifications of each of these pieces. In other words, a burner according to the invention has a better operational efficiency.

According to a specific embodiment, said injector block and said plate are made up of different materials.

An existing technical prejudice is opposed to the use of pieces made up of materials of a different nature, given the difficulties encountered when welding these pieces together. The use of a removable attachment between the injector block and the plate makes it possible to overcome this technical prejudice, the problem of incompatibility of the materials no longer arising in this scenario. It is thus possible to use different materials, which are suited to the needs and operational conditions specific to each of these pieces. Thus, the plate generally has a relatively simple geometry, but is nevertheless subjected to extreme operational conditions, as is described above. The injector blocks remains in the cold zone. However, the manufacturing thereof requires a high degree of precision with regard to the dimensioning of the gas distribution network and of the injectors. The choice of the material can also be based on the expected behavior under thermal stress for each of these pieces.

For example, it will be possible to use metal alloys or ceramics.

According to a specific embodiment, said burner is of the submerged type.

Submerged burners are particularly exposed to the deterioration linked to erosion by liquid glass and oxidation by flames. The advantageous features of the invention therefore have an impact that is all the more significant on these burners. Thus, the maintenance thereof is made less complex and more economical whereas the life of the injector block thereof is considerably increased.

According to a specific embodiment, said at least one injector extends at least partially into said injection hole.

The correct distribution of the gases injected into the furnace by the burners is a major issue. In a known manner, fulfilling this criteria depends in particular on the shape and the dimensions of the duct or ducts taken by the combustion gases before entering the melting chamber. With regard to this problem, common sense dictates that the single-piece character of the burner is preserved. Indeed, separating the plate and the injector block increases the risks of seeing these two separate parts of the burner move with respect to one another under the effect of heat. During the operation of the furnace and with an equal expansion coefficient, the plate in glass and/or flame contact would thus tend to expand more than the injector block, located in the cold zone. Such a relative movement of these two components would be able to, in particular, change the shape of the injection duct(s) and negatively impact upon the correct distribution of the combustion gases to be injected into the furnace.

Despite this existing technical prejudice, the use of a burner according to the invention, in which the injector extends at least partially into the injection hole makes it possible to obtain and retain a satisfactory alignment of the injector with the injection hole of the plate, while allowing the adoption of greater tolerances when producing the injector and/or the injection hole. In other words, controlling the injection of the combustion gases within the furnace is made easier.

According to a specific embodiment, said plate is attached to the injector block by means of:
a sacrificial screw-bolt assembly and/or
a screw-tap assembly and/or
a rivet and/or
a pin.

The means for removable attachment can thus optionally be of sacrificial type.

According to a specific embodiment, said plate comprises at least one planar sheet defining a perimeter around the injector or injectors.

In the description, the term "planar" describing the sheet is to be interpreted on the macroscopic scale, visible to the naked eye, and is not limited to a surface state, or other words, to specific texturing.

The aim of this sheet is to protect the injector block while allowing correct distribution of the combustion gases. Such a sheet is exposed to significant risks of oxidation given the positioning thereof in immediate proximity to the flame.

A burner according to this specific feature therefore offers the possibility of replacing the sheet independently of the rest of the plate, thus limiting the maintenance costs while increasing the overall life of the plate. This sheet considered separately is also less complex to machine, and offers the possibility, at the time of the design thereof, to choose materials specifically suited to the use thereof, with regard to criteria such as resistance to oxidation, thermal capacity, thermal expansion coefficient, and mass cost.

According to a specific embodiment, said at least one injector forms a protrusion above the sheet.

Using such a protrusion allows optimal control of the parameters involved in the mixture and the distribution of the combustion gases. Indeed, all of the pieces involved in the distribution, injection and combustion of the gases in the furnace are an integral part of the injector block. The flame produced by the combustion of these gases is therefore more effectively controlled.

Despite the existing technical prejudices with regard to the vulnerability of the protrusion through contact with the liquid glass, it has been surprisingly observed that the latter remains protected from the deterioration by erosion/oxidation that can arise on the surface of the plate. As such, the injector and the protrusion thereof remain cold zones even when the facility is operating, firstly due to the cooling provided by the combustion gases when the latter are injected cold into the furnace, and secondly due to the weak exposure of the flame base to the liquid glass and/or to the gases resulting from the combustion.

According to a specific embodiment, said plate comprises solid peripheral flanks rising up from said sheet.

These peripheral flanks allow for guaranteed stability of the flames in the glass flow by protecting them from being pressed back and blown.

Therefore, they are more exposed to the corrosion of the liquid glass and/or of the gases than the sheet but less to the risks of oxidation by the flames.

A burner according to this particular feature therefore offers the possibility of replacing the peripheral flanks independently of the other parts of the plate, thus limiting the maintenance costs while increasing the overall life of the plate. The peripheral flanks considered separately are also less complex to machine, and offer the possibility, when being designed, of choosing materials specifically suited to the use thereof, with regard to criteria such as resistance to corrosion and/or oxidation, thermal capacity, thermal expansion coefficient, and mass cost.

According to a specific embodiment, the peripheral flanks are removably attached to the upper surface of the injector block, and said sheet is fitted between the peripheral flanks and the upper surface of the injector block.

The fitting-attachment of the sheet to the peripheral flanks of the plate and to the upper surface of the injector block allows for easier dismantling and maintenance of this sheet.

According to a specific embodiment, said plate, and preferentially said sheet, comprises teeth which project from the upper face thereof.

These teeth in particular make it possible to stabilize the glass solidified layer, which are made to form at the surface of the burner, in direct proximity to the injectors and therefore to the flame.

According to a specific embodiment, said burner comprises a thermal paste layer at the interface between the injector block and the plate.

This thermal paste can, for example, be based on silicone, ceramics and/or metal particles.

Thus, it is possible to increase the thermal transfer between these two parts, notably for the purposes of cooling the plate using the injector block.

According to a specific embodiment, each injector comprises a mixing chamber in the shape of a cylinder, with an ejection hole, a fuel feed pipe and an oxidant feed pipe opening into the mixing chamber at the casing of the cylinder in a direction causing the fuel and the oxidant to flow tangentially with respect to the casing of the cylinder.

The direction of injecting the gases (fuel/oxidant) into the mixing chamber is of great importance. Indeed, it has been noted that it would be preferable to avoid an injection in a radial direction which would lead to a high degree of turbulence inside the mixing chamber and to flame instability. It is for this reason that the injection of the fuel and of the oxidant must occur in a tangential direction, the tangential flow of the gas mixture creating a regular vortex.

According to a specific embodiment, said injector block comprises a cooling system preferentially comprising a network of pipes that is suited to the circulation, inside the burner, of a cooling fluid.

The invention also relates to a method for assembling/dismantling a burner such as that described above.

The invention further relates to a facility for melting a composition of vitrifiable materials, characterized in that it includes at least one melting chamber supplied with at least one burner like that described above, preferentially of submerged type.

The technical advantages provided by a burner according to the invention, such as they are described in the present text, also relate to a facility for melting vitrifiable materials incorporating such a burner. The use of such a burner makes it possible to improve the productivity of the facility, with the occurrence of furnace shutdown in order to replace the burner being significantly reduced.

The invention also relates to the use of a facility like that described above for melting a composition of vitrifiable materials.

Other features and advantages of the invention are described hereinafter, with reference to the drawings in which:

FIG. 3 is a perspective view of a burner of submerged type comprising an annular injector, according to a specific embodiment of the invention;

FIG. 4 is a diagram representing a facility for melting vitrifiable materials according to a specific embodiment of the invention.

The reference numbers which are identical in the various figures represent similar or identical elements.

Figure 1:
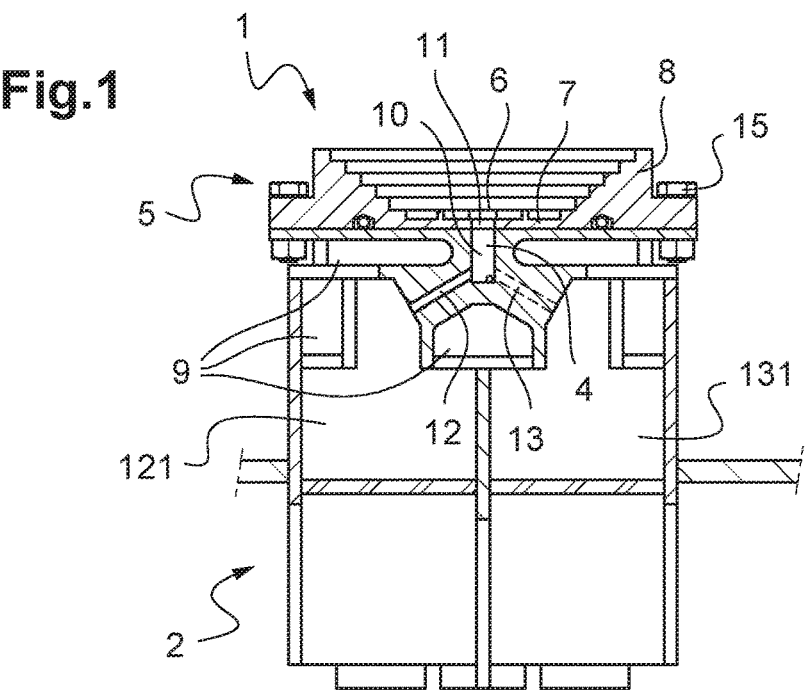
FIG. 1 is a sectional schematic view of a burner of submerged type according to a specific embodiment of the invention.

The invention relates to a burner 1 for a facility 20 for melting vitrifiable materials. This burner 1 comprises an injector block 2 comprising a combustion gas distribution network 3 and at least one injector 4. Such a burner 1 further comprises a plate 5 in glass and/or flame contact, which overlaps the injector block 2 and is provided with at least one injection hole 6 in fluid communication with the injector 4. Notably, the plate 5 is removably attached to the injector block 2.

The injector block 2 of a burner 1 according to the invention has a significantly increased life. Furthermore, the production of the injector block 2 and of the plate 5 is made easier, these two pieces being produced separately and potentially from different materials and/or using different methods.

FIG. 1 schematically represents a cross-section of a burner 1 of submerged type, according to a specific embodiment of the invention. According to an alternative embodiment, the burner 1 can also be of above-surface type. However, it should be noted that a burner 1 of submerged type particularly benefits from the technical advantages provided by the invention, due to the prolonged exposure thereof to the phenomena of erosion by the liquid glass and of oxidation by the flames.

This burner 1 comprises an injector block 2 at the lower part and a plate 5 at the upper part, which overlaps the injector block 2.

With regard to the injector block 2, the cutting plane of FIG. 1 passes through an injector 4 including a cylindrical mixing chamber 10 opening onto an ejection hole 11 coaxial with the injection hole 6 of the plate 5. Opening into the mixing chamber 10 are an oxidant feed pipe 13, located in the cutting plane, and a fuel feed pipe 12 located outside the cutting plane. The fuel and oxidant feed pipes 12 and 13 connect the mixing chamber to a fuel inlet pipe 121 and an oxidant inlet pipe 131, respectively, which are located in the lower part of the injector block 2. Pipes 9 make it possible to circulate a cooling liquid inside the burner 1 and run through it over almost the entire length thereof.

The injector block 2 is made up of stainless steel. According to alternative embodiments, the injector block 2 is formed from another known material suitable for this industrial application.

Figure 2:
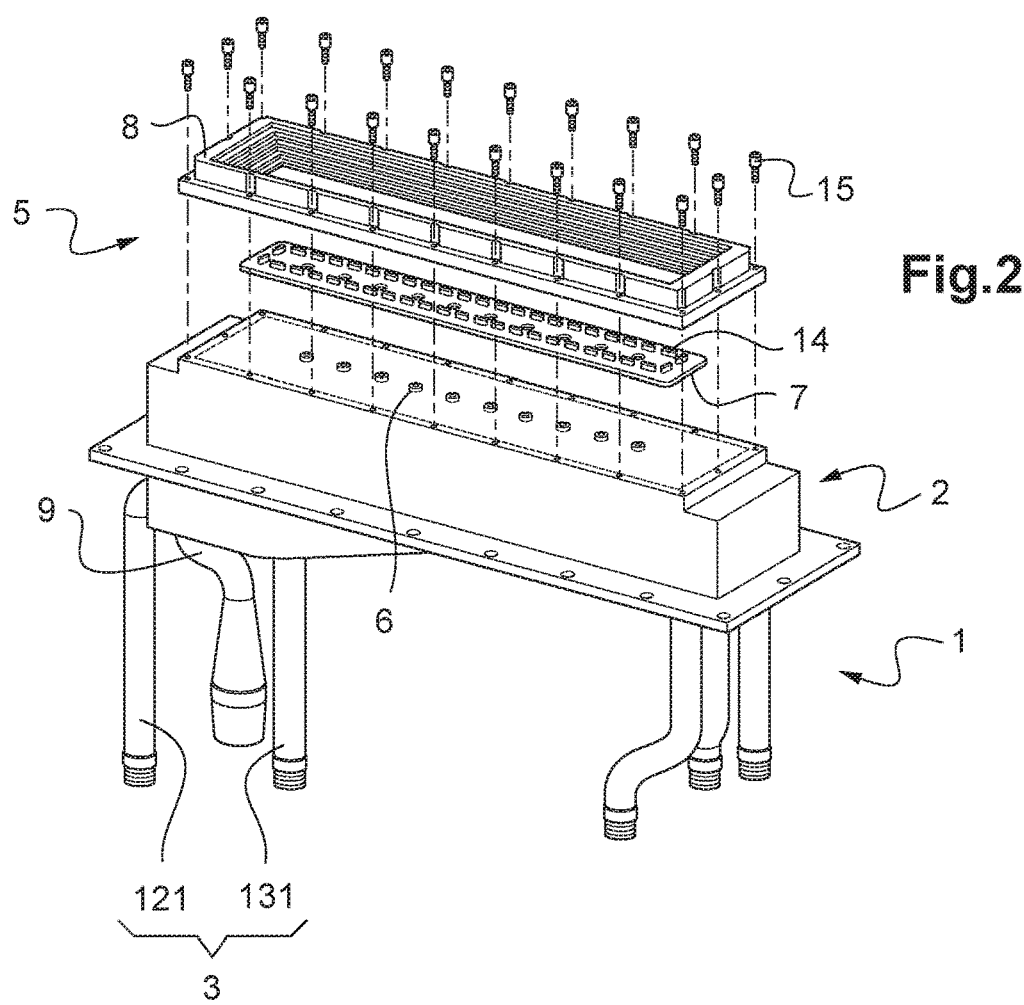
FIG. 2 is an exploded schematic view of a burner like that represented in FIG. 1.

As illustrated in FIGS. 1 and 2, and according to the embodiment described below, the plate 5 is made up of the assembly of a horizontal sheet 7, intended to be arranged in proximity to the injection holes 6, with solid lateral flanks 8 which extend like stairs or steps, from the ends of the sheet 7. This sheet 7 further comprises teeth 14 which project from the upper face thereof. These teeth 14 are mainly used to stabilize the glass solidified layer formed at the surface of the burner in direct proximity to the injectors 11 and therefore to the produced flame.

It should be noted that, according to an alternative embodiment, the plate 5 consists of a single-piece. As a result, it has the disadvantage of being more complex to manufacture/maintain.

Returning to the injector block 2, the latter comprises a plurality of protrusions suitable for projecting from the sheet 7, through the injection holes 6. The use of such protrusions makes it possible to retain a satisfactory alignment of the injection holes 6 of the plate 5 with the respective injector 4 thereof, and to optimally control the parameters involved in the mixing and distribution of the combustion gases. The flame resulting from the combustion of these gases is, therefore, more effectively controlled.

As already indicated in the text and illustrated, the plate 5 is removably attached to the injector block 2. This attachment is provided by an assembly of screws 15 and corresponding taps. The sheet 7 is attached by means of fitting between the upper surface of the injector block 2 and the lower part of the solid lateral flanks 8. According to alternative embodiments, this sheet 7 is directly attached to the injector block 2 by any type of known means for removable attachment. Moreover, the sheet 7 can also be directly attached to the lateral flanks 8 by any attachment known type, whether removable or not.

According to other alternative embodiments, the lateral flanks 8 can be removably attached to the injector block 2 by means of a screw-bolt-type assembly or any other known means for removable attachment, whether or not it involves the destruction of the means for attachment when dismantling. It should be noted that, regardless of the chosen means for attachment, the integrity of the injector block 4 and of the plate 5 is preserved after assembling/dismantling.

According to an alternative embodiment, and as represented in FIG. 3, the burner comprises an annular-type injector 4 projecting from a wall 21a of the melting chamber 21. The wall 21a through which the injector 4 passes is alternatively the bottom of the melting chamber or one of the lateral walls thereof. The injector 4, with a cylindrical shape, is overlapped by a plate 5 which is also cylindrical, to which it is removably attached by means of two screws 15. According to this configuration, the injection hole 6 of the plate 5 is positioned as a continuation of the ejection hole 11 of the injector 4.

According to a specific embodiment, the invention relates to a method for assembling/dismantling a burner 1 as described in the present text, the assembling method comprising the following steps:

affixing the sheet 7 on the upper surface of the injector block 2, affixing the lateral flanks 8 on the circumference of the sheet 7, and reversibly rigidly connecting the lateral flanks 8 to the injector block 2 by means of screws 15 engaging corresponding taps.

The dismantling method consists in carrying out these successive steps in reverse order.

According to a specific embodiment, and as illustrated in FIG. 4, the invention relates to a facility 20 for melting vitrifiable materials comprising a melting chamber 21. The vitrifiable materials are inserted into the melting chamber 1 by a charger 22. The melting chamber 21 includes, at the bottom, submerged burners 1 such as that described above. The level of the bath of glass 23 is determined by the position of an overflow 24 through which the obtained liquid glass flows. The melting chamber 21 includes metal walls crossed by a system of internal pipes 9 in which a cooling liquid circulates. The active cooling of the walls results in the formation of a layer of solidified glass 25 which isolates the metal walls from the bath of glass.

According to a specific embodiment, the invention relates to the use of such a facility to melt a composition of vitrifiable materials, in particular for forming hollow glass of the bottle, vial type, glass fibers of the thermal or sound insulation mineral wool type or so-called reinforcing textile glass yarns.

The invention claimed is:

1. A burner for a facility for melting vitrifiable materials, comprising:
   an injector block comprising a combustion gas distribution network and at least one injector, and
   a plate in glass and/or flame contact which at least partially overlaps said injector block and comprises at least one injection hole in fluid communication with said injector,
   wherein the plate is removably attached to the injector block,
   wherein said plate comprises at least one planar sheet defining a perimeter around the injector or injectors, and
   wherein the plate includes lateral flanks and the at least one planar sheet is removably connected to the lateral flanks.

2. The burner as claimed in claim 1, wherein said injector block and said plate are made up of different materials.

3. The burner as claimed in claim 1, wherein the burner is of the submerged type.

4. The burner as claimed in claim 1, wherein said at least one injector extends at least partially into said injection hole.

5. The burner as claimed in claim 1, wherein said plate is attached to the injector block by means of:
   a sacrificial screw-bolt assembly and/or
   a screw-tap assembly and/or
   a rivet and/or
   a pin.

6. The burner as claimed in claim 1, wherein said at least one injector forms a protrusion above said planar sheet.

7. The burner according to claim 1, wherein the lateral flanks are solid peripheral flanks rising up from said planar sheet.

8. The burner as claimed in claim 7, wherein the solid peripheral flanks are removably attached to an upper surface of the injector block, and wherein said planar sheet is fitted between the peripheral flanks and the upper surface of the injector block.

9. The burner as claimed in claim 1, wherein said plate comprises teeth which project from an upper face thereof.

10. The burner as claimed in claim 1, further comprising a thermal paste layer at the interface between the injector block and the plate.

11. The burner as claimed in claim 1, wherein each injector comprises a mixing chamber in the shape of a cylinder, with an ejection hole, a fuel feed pipe and an oxidant feed pipe opening into the mixing chamber at the casing of the cylinder in a direction causing the fuel and the oxidant to flow tangentially with respect to the casing of the cylinder.

12. The burner as claimed in claim 1, wherein said injector block comprises a cooling system comprising a network of pipes that is suited to the circulation, inside the burner, of a cooling fluid.

13. A method comprising assembling/dismantling a burner as claimed in claim 1.

14. A facility for melting a composition of vitrifiable materials, comprising at least one melting chamber supplied with at least one burner as claimed in claim 1.

15. A method comprising melting a composition of vitrifiable materials with the facility as claimed in claim 14.

16. The burner as claimed in claim 9, wherein said planar sheet comprise teeth which project from an upper face thereof.

17. The burner as claimed in claim 1, wherein the plate is removably attached to the injector block with one or more detachable fasteners that directly attach the plate to the injector block.

18. The burner as claimed in claim 1, wherein the at least one planar sheet is connected to the lateral flanks with one or more fittings between an upper surface of the injector block and a lower part of the lateral flanks.

19. The burner as claimed in claim 1, wherein the at least one planar sheet is directly attached to the injector block, or the lateral flanks or both.

20. The burner as claimed in claim 1, wherein the lateral flanks are affixed on a circumference of the at least one planar sheet and the lateral flanks are reversibly attached to the injector block.

\* \* \* \* \*